(12) United States Patent
Mueller et al.

(10) Patent No.: US 6,180,228 B1
(45) Date of Patent: Jan. 30, 2001

(54) OUTDOOR ADVERTISING SYSTEM

(75) Inventors: Bruno Mueller, Duesseldorf; Elmar Paul Johannes Klameth, Aachen; Siegfried Rainer Goeb, Willich, all of (DE)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/033,296

(22) Filed: Mar. 2, 1998

(51) Int. Cl.[7] .............................. B32B 7/12; B32B 31/00
(52) U.S. Cl. ............................ 428/354; 428/355 RA; 428/355 AC; 428/42.1; 428/480; 428/142; 428/143; 427/207.1
(58) Field of Search .................... 428/354, 355 RA, 428/355 AC, 41.7, 42.1, 480, 142, 143, 145; 427/207.1

(56) References Cited

U.S. PATENT DOCUMENTS

| | | |
|---|---|---|
| Re. 25,751 | 4/1965 | Seedorf . |
| 3,547,796 | 12/1970 | Albrinck et al. . |
| 4,172,063 | 10/1979 | O'Brill . |
| 4,196,243 | 4/1980 | Sachs et al. . |
| 4,248,922 | 2/1981 | Shortway et al. . |
| 4,328,274 | 5/1982 | Tarbutton et al. . |
| 4,689,259 | 8/1987 | Miller, Jr. et al. . |
| 4,875,799 | 10/1989 | Harrison . |
| 4,921,754 | 5/1990 | Ishihara . |
| 4,944,514 | 7/1990 | Suiter . |
| 5,167,087 | 12/1992 | Plumly . |
| 5,246,757 | 9/1993 | Condon et al. . |
| 5,286,682 | 2/1994 | Jacobs et al. . |
| 5,380,549 | 1/1995 | Harvison . |
| 5,389,413 | 2/1995 | Condon et al. . |
| 5,453,320 | 9/1995 | Harper et al. . |
| 5,468,532 | 11/1995 | Ho et al. . |

FOREIGN PATENT DOCUMENTS

| | | | |
|---|---|---|---|
| 0 492 907 | 1/1992 | (EP) | ................................ E01F/9/04 |
| 683 268 A2 | 11/1995 | (EP) . | |
| 53-113875 | 10/1978 | (JP) . | |
| 56-5638 | 1/1981 | (JP) . | |
| 57-51460 | 3/1982 | (JP) . | |
| 59-157035 | 10/1984 | (JP) . | |
| 59-230745 | 12/1984 | (JP) . | |
| 4-305500 | 10/1992 | (JP) . | |
| 7-11202 | 1/1995 | (JP) . | |
| 7-207828 | 8/1995 | (JP) . | |
| WO 97/18947 | 5/1997 | (WO) . | |

OTHER PUBLICATIONS

ASTM Standard E 303–93, "Standard Test Method for Measuring Surface Frictional Properties Using the British Pendulum Tester," Annual Book of ASTM standards, vol. 04.03.

Product Brochure, "3M™ Scotchprint™ and Electrostatic Graphic Materials" 1996.

Product Brochure, "3M™ Floorminders™ Graphics" 1997.

Product Brochure, "3M™ Floorminders™ Graphics with New Clear Base Film" 1997.

*Primary Examiner*—Daniel Zirker
(74) *Attorney, Agent, or Firm*—Dale A. Bjorkman

(57) ABSTRACT

The present invention is an outdoor advertising or display system including a multi-layer graphic article intended for application to an outdoor surface such as concrete, asphalt and the like. The advertising system includes an imageable base layer and an image-protective surface layer that can be laminated to the base layer following imaging of the base layer. The image-protective surface layer is frictionally modified to provide an anti-skid layer for surface traffic.

20 Claims, 3 Drawing Sheets

OUTDOOR ADVERTISING SYSTEM

BACKGROUND OF THE INVENTION

1. Field of the Invention

The present invention relates to the field of outdoor advertising using an informational or decorative graphic article. More particularly, the present invention relates to an outdoor display, information, or advertising system comprising a multi-layer graphic article that is applied to an outdoor surface such as concrete, asphalt and the like. Even more particularly, the present invention relates to an outdoor advertising system including an imageable base layer and a frictionally modified surface layer that can be laminated to the base layer following imaging of the base layer to protect the image.

2. Description of Related Art

To convey an informational message to a viewer, or simply to decorate a surface, a myriad of graphic articles are available for application to a wide variety of substrates. For example, U.S. Pat. No. 5,468,532 to Ho et al. describes a multilayer decorative graphic article intended for application to a surface, such as a motor vehicle body, marine craft hull, snowmobile body, vertical sign face, or the like. The graphic article described in the '532 patent to Ho comprises a substrate, at least one color layer disposed on the substrate, and a "clear" or "transparent" protective surface layer that overlies the substrate and the color layer. The Ho patent teaches that the color layer, which can be continuous or discontinuous, is visible through the protective surface layer. The protective layer described in the '532 patent can be formulated to provide the graphic article with interior surface protection properties, such as resistance to scuffing and chemical attack from indoor cleaning solutions, cosmetics, food and the like. In the alternative, the Ho reference discloses that the protective layer can be formulated to render the graphic article weatherable and resistant to exposure to harsh chemicals such as motor fuel. While extremely versatile, the un-textured protective surface films described in the '532 would not be expected to have the skid resistance necessary for use in an advertising article that is to be applied to a horizontal surface with pedestrian traffic. In addition, the Ho patent does not contemplate a display system that would be imageable and readily changeable by the advertiser.

The decorative polymeric layer materials described in U.S. Pat. No. 4,248,922 to Shortway et al., which are intended for use as floor, wall or ceiling coverings, include a base layer with either an embossed or a smooth surface. The base layer, typically a fibrous backing layer, is printed on one surface with a multi-colored pattern or design. Overlying the design on the base layer is a wear layer, which can have a relatively smooth surface, or a surface embossed in selected areas to provide texture or effect. Again, while extremely versatile, the coverings described in the '922 patent to Shortway would not be expected to have the necessary anti-skid properties necessary for outdoor applications. In addition, the polymeric layer components described in the '922 patent would not be expected to be readily removable from an outdoor surface to provide an advertising article that can be easily changed by the advertiser.

To reach potential purchasers with outdoor advertising, advertisers have traditionally used print media and television commercials to disseminate information about new products, product features, and prices. These "traditional" forms of advertising, while highly effective, reach the customer a significant distance from the point of product purchase. In recent years advertisers have sought to reach potential customers for their products in many innovative ways, moving ever closer to the point of purchase in an attempt to positively influence the purchase decision and take advantage of the advertiser's brand identity. One non-traditional advertising approach that has enjoyed success in recent years is the "floor graphic," a multi-layer informational graphic article with an non-uniform uppermost surface intended for horizontal application for a quite short duration on an exposed area of a floor. While the application of graphics via adhesive to areas of foot traffic is quite old, use of such graphics for brand advertisement is becoming very accepted because of the beauty of the image in the graphic. Floor graphics, such as those sold by Minnesota Mining and Manufacturing Company (3M) of St. Paul, Minn., USA under the trade designation "FloorMinders" graphics, are intended for indoor branding or other informational application to areas of the floor in supermarkets, department stores, lobbies, convenience stores and the like. These graphic articles are not applied to the floor to make it more durable. Rather, these graphic articles are applied to the floor in an area near an advertiser's product on the shelf or aisle, near points of purchase where marketing surveys indicate a significant percentage of purchase decisions are made by the buyer. The graphic articles are multi-layer film constructions comprising two principal components: an imageable base film, which can be clear or colored, an image layer applied to the base film, and protective top film that overlies the base film and the image layer. The base film, which can be cut to a suitable shape or size, includes on a first surface a base film adhesive to adhere the graphic article to the indoor floor surface. On a second surface, the base film includes a highly detailed image layer produced by a suitable method such as, for example, electrostatic printing or screen printing. To protect the image on the base film from foot traffic because the image can not become obscured or damaged to assure continued good brand recognition, a substantially clear protective layer with a non-uniform upper surface is applied over the image layer and the base film. The protective layer typically includes a substantially clear pressure sensitive adhesive to adhere to the image layer and/or the base film.

In view of the demonstrated success of floor graphic articles, it is desired to use them not only indoors near the advertised product, but also outdoors on horizontal surfaces such as sidewalks, parking lots, and the like, to entice the potential customer into the place of business where the advertised products are sold. However, the multi-layer laminates previously used for indoor floor graphics have not proved suitable for outdoor use on surfaces intended for foot traffic. First, to ensure that the graphic article is suitable for use on outdoor surfaces subject to foot traffic, the protective layer must not only be formulated to be weatherable in an outdoor environment, but must also maintain sufficient skid resistance to allow persons to safely walk over the graphic article without loss of footing.

To modify the frictional properties of an exposed, upper surface of a clear, image-protecting film, U.S. Pat. No. 4,238,274 to Tarbutton et al. describes a transparent friction surface sheet intended for application to a skateboard or similarly smooth surface with an ornamental design. The friction surface layer in the '274 patent includes a substantially clear film with transparent glass particles no larger than 10 Tyler mesh embedded in a binder on an exposed surface of the film. The '274 patent notes that the glass particles on the exposed surface of the layer can be applied to permit visual observation of an underlying decorative design such as, for example, an ornamental design on the surface of a skateboard, with little or no distortion. The '274 patent also suggests that a surface of the sheet can be imprinted with a design, message or other indicia.

SUMMARY OF THE INVENTION

There is a need in the art for a display or advertising system that has a separate imageable film layer and a protective layer specifically adapted for use in outdoor applications subject to foot traffic. Such a separate layer of imageable material can be imaged by the consumer with conventional, commonly available printing equipment. The desired two component system would also be easily assembled by the consumer with conventional laminating equipment, and could be readily modified as dictated by the consumer's ever-changing advertising needs.

In one aspect, the present invention is a multilayer graphic article specifically adapted for outdoor advertising applications. The graphic article of the invention, which is preferably applied to a horizontal surface where pedestrian traffic is expected, comprises an imageable base layer and an image-protective layer. The imageable base layer has applied to its first major surface a layer of an adhesive that is removable from an outdoor surface without leaving substantial residue on the outdoor surface. An image layer is applied to a second major surface of the base layer by screen printing, electrostatic printing, thermal ink jet printing and the like. The image-protective surface layer includes pressure sensitive adhesive layer on a first major surface to adhere to the image layer and/or the base layer. On a second major surface, the frictional properties of the image-protective surface layer are modified by embossing or incorporation of abrasive materials in a pattern which provides skid resistance for pedestrian traffic but does not substantially obscure the informational impact of the underlying image layer. To create a graphic article, the first major surface of the image-protective surface layer can be laminated to the image layer on the base film and/or the base film itself. The graphic article can then be releasably adhered to an outdoor surface using the adhesive applied to the first major surface of the base layer.

In another aspect, the present invention is an outdoor advertising system including the multi-layer decorative or informational graphic article described above. The graphic article used in the advertising system of the invention includes two principal components: an imageable polymeric base film and a substantially clear image-protective polymeric surface film, preferably with a frictionally modified exposed surface.

The base film includes a first major surface having applied thereon an adhesive layer appropriate to adhere the graphic article to an outdoor surface. The adhesive in this layer is selected to allow removal of the graphic article from the outdoor surface while leaving behind substantially no adhesive residue on the surface. This adhesive layer is preferably covered with a readily removable release liner to protect the adhesive. A second major surface of the base film is suitable for application of layers of colors to form thereon a printed image layer. The second major surface of the base film can be digitally imaged by the purchaser, who can print any custom advertising message thereon by any conventional printing method on commonly available printing equipment.

The image-protective surface film includes a first major surface having applied thereon a layer of a substantially clear adhesive, preferably protected by a readily removable release liner. If pedestrian traffic is expected over the article, a second major surface of the image-protective layer is frictionally modified by embossing, roughening, or adhering abrasive particles. The frictional modification of the second major surface of the image-protective layer is preferably performed in a patterned fashion that does not unnecessarily obscure the underlying image layer on the base film.

To create a display or advertise outdoors using the advertising system of the present invention, the second major surface of the base film is imaged by screen printing, electrostatic printing or the like using conventional equipment to form an image layer thereon. Next, the release liner is removed from the first major surface of the image-protective layer to expose the pressure sensitive adhesive. The image-protective layer can then be laminated to the image layer of the base film by any conventional method. The release liner is then removed from the second major surface of the base film and the base film is adhered to an outdoor surface such as a sidewalk or a parking lot to create an outdoor advertisement or display. In the alternative, the base film can first be adhered to the outdoor surface, and the image-protective film applied thereto to form the advertisement.

The advertising system of the present invention can be provided as a multi-component kit including the base film and the image-protective film described above, or can be supplied as individual components. This multi-component construction allows the advertising graphics of the present invention to be prepared outside of the factory environment, for example, at a local print shop.

The advertising system of the present invention makes possible the application of outdoor floor graphics with excellent advertising impact. These advertising graphics are skid resistant to enhance safety for the shopper or pedestrian, and are readily removable to provide continuously updateable advertising messages. The graphics of the advertising system of the present invention can be readily prepared by any print shop with laminating and printing capabilities.

A feature of the invention is a non-uniform uppermost surface to contact foot traffic to provide sufficient skid-resistance without compromising the image quality of the graphic beneath that surface. For example, as one walks toward the image graphic adhered to a sidewalk, one is able to see the underlying image without appreciable distortion.

An advantage of the invention is a modular construction of the advertising system such that the graphic can be printed centrally and distributed unlaminated or be printed remotely and laminated on site.

DETAILED DESCRIPTION OF THE INVENTION

Figure 1:
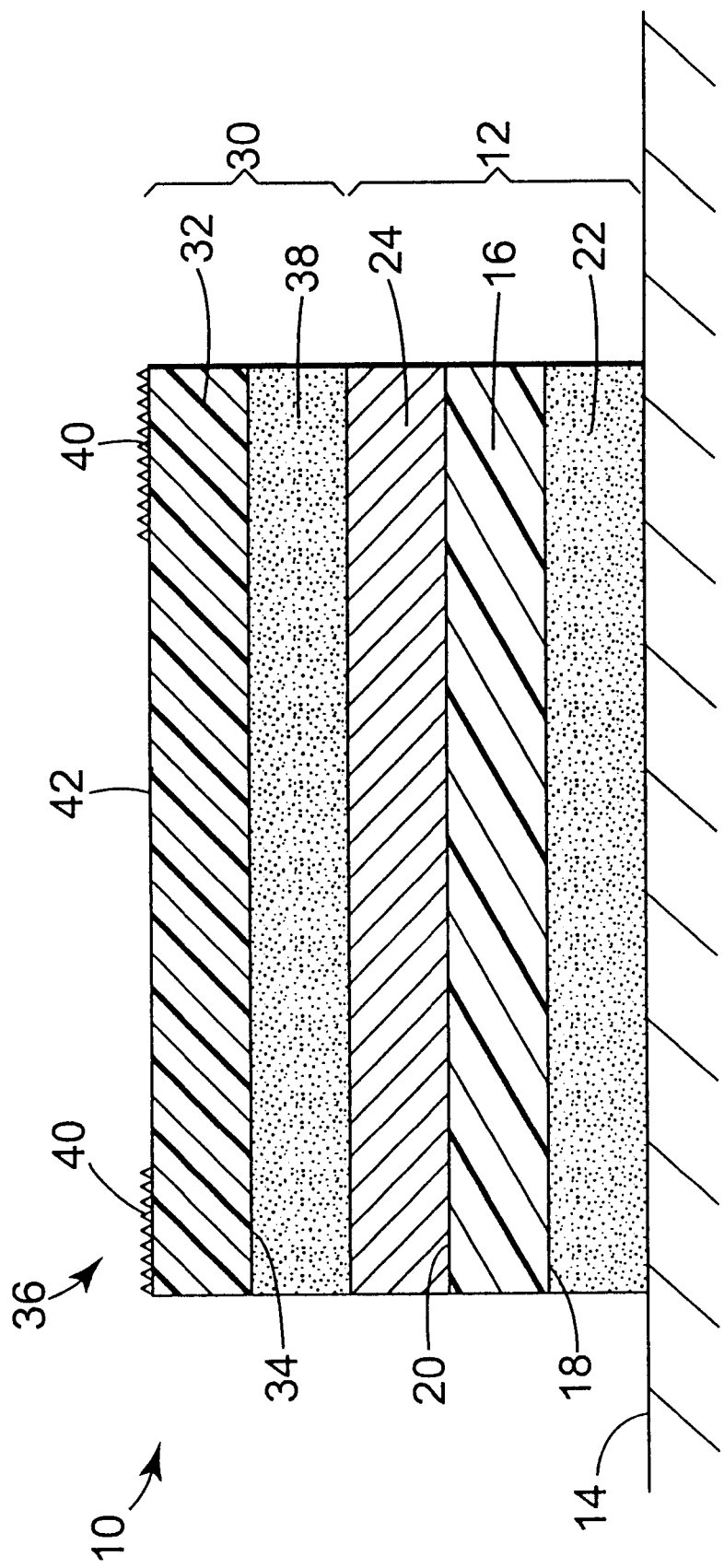
FIG. 1 is a schematic cross sectional view of an embodiment of an assembled multilayer graphic article of the present invention.

Referring to FIG. 1, which is not drawn to scale, a multilayer graphic article 10 is shown, which comprises an imaged base component 12 affixed to an outdoor substrate 14, and an image-protective component 30 affixed to and overlying the base component 12. The base component 12 includes a base layer 16 that is preferably a sheet of polymeric film engineered to enhance the strength and/or the flexibility of the graphic article. The film selected for the base layer 16 should be flexible and conformable to irregular substrates typically found outdoors such as concrete, asphalt, tile, terrazzo, brick, stone and the like. The base layer 16 can be transparent, translucent, substantially clear or colored. In addition, at least one major surface of the base layer 16 must be imageable. The term "imageable" as used herein means that the base layer must be compatible with one or more continuous or discontinuous color layers deposited thereon by a conventional printing process such as, for example, thermal transfer, offset printing, screen printing, electrostatic printing and ink jet printing.

Materials suitable for the polymeric film base layer 16 include alpha-olefins such as polyethylene, polypropylene, and blends and copolymers thereof; ethylene-modified copolymers such as ethylene vinyl acetate, ethylene acrylic acid, ethylene methacrylic acid, ethylene methacrylate and blends and mixed polymers of these materials such as ethylene methylacrylate acrylic acid terpolymers, polyurethanes, poly(vinyl chloride) and rubbery polymers such as ethylene propylene diene monomer terpolymer, rubber modified polyolefins and styrene butadiene rubbers. A particularly preferred material for the base layer 16 is a vinyl film.

The thickness of the base layer 16 can vary widely depending on the intended advertising application, the expected surface traffic, and the outdoor surface to which the layer is to be applied. Typically, the base layer 16 will be about 1 mil (0.003 cm) to about 10 mils (0.03 cm) thick, with a thickness of about 4 mils (0.01 cm) preferred for most applications expected to be subjected to pedestrian traffic. If high traffic levels are expected, to provide more convenient removability from the substrate, or to enhance compatibility with an adhesive layer, a surface of the base layer 16, or selected portions thereof, can be reinforced. For example, a thin metal or foil layer, a woven or nonwoven scrim layer, or a layer of fibrous material (not shown in FIG. 1) can be applied to a surface of the base layer with a suitable adhesive, or can be incorporated between two layers if polymeric film to form a reinforced base sheet-like construction. In addition, although not shown in FIG. 1, to enhance adhesion between adjacent layers, the graphic article of the present invention can include one or more tie layers between otherwise adjacent layers of the construction.

On a first major surface 18 of the base layer, or, if the reinforcing layer is used, on an exposed surface thereof, an adhesive layer 22 is applied. This adhesive layer 22, referred to herein as the base adhesive layer 22, can be selected from any adhesive appropriate to attach the base layer 16 to an outdoor substrate 14. It is also particularly preferred that the adhesive used to form the base adhesive layer 22 be removable from an outdoor substrate 14. As used herein, the term removable means that the base adhesive layer 22 should preferably be selected to permit the base layer 16 and/or the graphic article 10 to be easily removed from an outdoor substrate 14 without leaving substantial adhesive residue on the substrate 14.

Pressure sensitive adhesives and laminating adhesives are particularly useful for the base adhesive layer 22, and adhesives based on acrylics, natural rubbers, styrene-isoprene-styrene block copolymers, and silicone based adhesives such as polydimethylsiloxane and polymethylphenylsiloxane can be used. Adhesives useful to form the base adhesive layer 22 can also include additives such as fibers, ground glass, titanium dioxide, silica, glass beads, waxes, tackifiers, low molecular weight thermoplastics, oligomeric species, plasticizers, metallic flakes, metallic powders. These additives should be added to the base layer adhesive 22 in an amount that does not materially affect the ability of the adhesive to bond the base layer 16 to an outdoor surface 14. The adhesive used as the base adhesive layer 22 can also be crosslinked. For example, for use on a typical concrete surface, the adhesives selected should have a 180° pullback adhesion to concrete block of about 250 g/in to about 1250 g/in, and should be applicable to an outdoor substrate within a temperature range of about 10° C. to about 30° C.

Acrylic adhesives are preferred for the base adhesive layer 22, and suitable examples include crosslinked acrylics such as those available under the trade designations "Scotch Laminating Adhesive 468 MP" and "Stamark Laminating Adhesive 9505" from 3M, St. Paul, Minn., USA, as well as tackified acrylics such as those available under the trade designations "Scotch Laminating Adhesives 9472 and 9774" from 3M.

The base film adhesive should be applied on the first major surface of the base film at a thickness of about 2 mils (0.005 cm) to about 10 mils (0.025 cm), and a thickness of about 5 mils (0.013 cm) is preferred for most applications. If desired, the surface of the base adhesive layer 22 which is to be applied to the outdoor substrate 14 can be treated to permit repositioning of the graphic article 10 and/or the base layer 16 before a permanent bond is formed with the substrate 14.

An image layer 24 is disposed on a second major surface 20 of the base layer. The image layer 24 can be comprised of one or more color layers, any of which can be applied continuously or discontinuously to form an informational or decorative design. The specific number of color layers used for a particular application can be dictated by the desired visual impact of the graphic article, printing costs, and the like. However, several color layers are particularly preferred to provide an image layer with significant advertising impact. These multi-color image layers are typically digitally created and applied in one pass through a large format printer to provide an image with photograph-like realism. The color layers making up the image layer 24 can be applied by any known printing or painting method for forming an image on a polymeric film, including, for example, screen printing, electrographic (electrostatic and electrophotographic) printing, offset printing, thermal ink jet printing or thermal mass transfer. A preferred printing process for vinyl base layers is the electrostatic printing process available from 3M, St. Paul, Minn., USA, under the trade designations "Scotchprint" and "Scotchprint 2000."

As is well known, the color layers useful in the present invention can be provided as an aqueous solution, emulsion or dispersion comprising a binder, a color agent and various optional ingredients. As described in, for example, U.S. Pat. No. 5,468,532 to Ho et al., which is incorporated herein by reference, suitable color layer compositions can be engineered to provide specific benefits to the image layer. For example, the binder or binders selected for use in the color layers can display hot melt adhesive properties and can be blended to improve the tensile strength, heat resistance, and environmental resistance of the color layer, as well as its adhesion to the base layer or image-protective surface layers. The binder used in the color layers can be crosslinked to alter the modulus, the dimensional stability in response to temperature and humidity, melting temperature, tensile strength, adhesion or heat resistance of the image layer. Other optional additives which can be incorporated into the color layer include cosolvents, defoamers, surfactants, antioxidants, light stabilizers, ultraviolet light absorbers, biocides and the like.

The second component of the graphic article of the present invention is a substantially clear or transparent image-protective component 30 that overlies both the image layer 24 and exposed portions of the base layer 16 to protect the image layer 24 from abrasion and the environment. The term substantially clear or transparent as used herein means that the underlying image layer 24 can be viewed through the image-protective component 30 such that the presence of the image-protective component 30 does not detract from the appearance of the image layer 24. The image-protective component can be made of a wide variety of materials, depending in significant part on the degree of protection to be provided to the underlying image layer. The image-protective component 30 includes a polymeric film layer 32 that is resistant to weather, abrasion and chemical exposure. Suitable materials for the image-protective layer 32 include polyurethane based compounds, olefin/vinyl carboxylic acid copolymers such as ethylene-acrylic acid and ethylene-methacrylic acid copolymers, polyesters such as polyethylene terephthalate, polyolefins such as polyethylene, ethylene-vinyl acetate and ethylene-methacrylate. Preferred materials for use as the image-protective layer 32 include vinyl and polyurethane based polymeric films.

Applied to a first major surface 34 of the image-protective layer 32 is an adhesive layer 38 appropriate to adhere the image-protective layer 32 to the image layer 24 and/or exposed portions of the base layer 16 that are not covered by the image layer 24. The adhesive selected for use on the first major surface 34 of the image-protective layer 32 can vary widely depending on the intended application. Any appropriate adhesive can be applied to the image-protective layer 32, as long is it is substantially clear so that the image layer 24 is not obscured when the image-protective component 30 is applied as an overlaminate on the base layer component 12 to form the graphic article. Polyurethane based adhesives and acrylic pressure sensitive adhesives have been found to work well to form the adhesive layer 38.

A second major surface 36 of the image-protective layer 32 is intended for exposure to the environment, and must provide a non-skid surface for pedestrian or light vehicular traffic. To be suitable for such applications it is important that the frictional properties of at least a portion of the second major surface 36 of the image-protective layer be modified to provide safe, non-skid passage for vehicles or pedestrians. The techniques used to modify the frictional properties of the exposed surfaces of the image-protective layer can vary widely depending on the intended application and expected traffic. For pedestrian traffic, the resulting surface must comply with Australian/New Zealand Standard "Slip Resistance of Pedestrian Surfaces," which is incorporated herein by reference. To determine compliance of the frictional properties of the second major surface of the image-protective layer with this or a similar standard, known tests such as ASTM E-303-93 can be used. In ASTM E-303-93 a pendulum tester with a rubber slider is raised a predetermined distance above a test surface. The slider is then allowed to contact the surface, and a drag pointer indicates the British Pendulum Tester number (BPN). The greater the friction between the slider and the test surface, the more the swing of the pendulum is retarded, and the larger the BPN reading. Four swings of the pendulum are made for each test surface. Under the test parameters specified in ASTM E-303-93, a minimum BPN of about 35 is desirable for a pedestrian surface, and a BPN range of about 35 to about 65 is preferred for general use on outdoor surfaces.

To produce a material with a skid resistant surface appropriate for pedestrian traffic, many known techniques can be used to modify the frictional properties of the second major surface 36 of the image-protective layer 32. For example, to increase skid resistance all or a portion of the surface of the image-protective layer can be embossed or roughened. The degree of roughening, the height of the projections in the embossed areas, and the ratio of embossed to unembossed area on the surface can vary widely depending on the expected surface traffic and the complexity of the underlying image layer. An example of a suitably surface modified film for pedestrian traffic is a clear polymeric film available from 3M, St. Paul. Minn., USA under the trade designation "SafetyWalk," preferably the "Fine Resilient" grade. To maintain the advertising impact of the image layer, or, to ensure that the image layer is not substantially obscured or distorted when viewed from the perspective of an approaching pedestrian, it can also be necessary to adjust the index of refraction of the image-protective layer or the ratio of embossed area to unembossed area on the surface.

Figure 2:
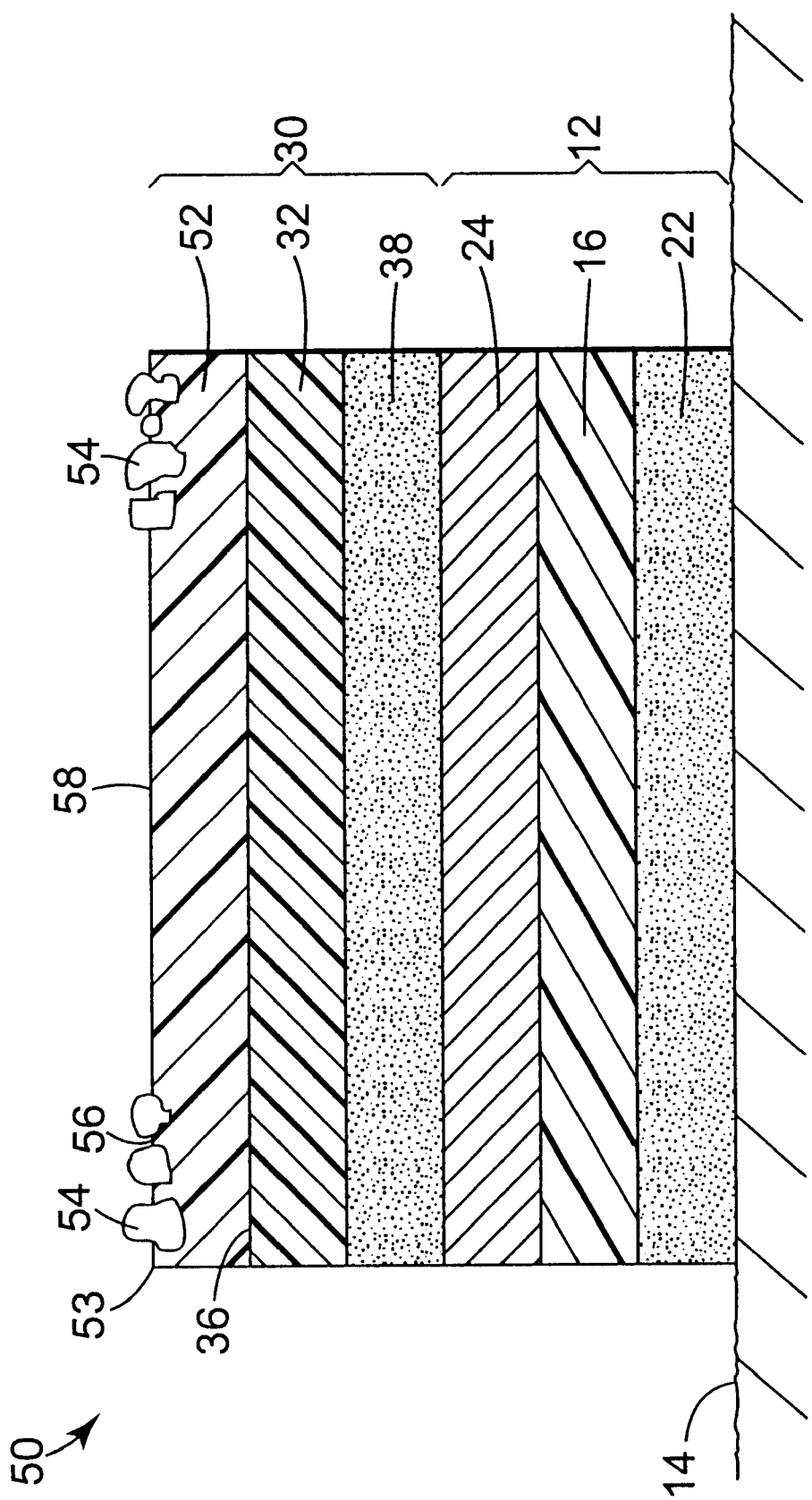
FIG. 2 is a schematic cross sectional view of another embodiment of an assembled multilayer graphic article of the present invention.

Another technique which can be used to modify the surface properties of the second major surface of the image-protective layer is shown in an embodiment of a graphic article 50 of the present invention illustrated schematically in FIG. 2, which is not drawn to scale. In the graphic article 50, the image-protective layer 32 is coated on its second major surface 36 with at least one layer 52 of a substantially clear binder composition. Examples of suitable binder materials include those described in U.S. Pat. No. 4,328,274, and polyurethanes and poly(vinyl chloride) are particularly preferred. In the binder layer 52 small abrasive particles 54 are embedded and adhered in an exposed surface 53 of the binder layer in an amount sufficient to provide a skid resistant surface. The abrasive particles adherently bond to the binder layer and are arranged and sized to project above the surface of the binder layer to provide skid resistance on the surface. Generally, to ensure that the abrasive particles will extend above the binder layer to provide adequate skid resistance, the binder layer should only about half the diameter of the abrasive materials selected. Suitable abrasive materials 54 for use in the present invention include, for example, silica-based or glass particles, and aluminum oxide particles. Transparent particles are particularly preferred to preserver the brightness, clarity and contrast of the underlying image layer. In addition, other particles, such as, for example, reflective or translucent particles, can be intermixed with the abrasive particles to provide a construction with unique retroreflective or light transmissive properties.

The size, shape and composition of the abrasive materials 54 can be selected to provide the desired degree of skid resistance on the surface, but generally, the particles should be about 10 to about 1000 μm in size. It is also preferred that the size and refractive index of the abrasive particles be selected so the underlying image layer 24 is not substantially obscured or distorted when viewed from the perspective of an approaching pedestrian. For example, a transparent particle with a size of no larger that about 0.5 mm is necessary for a graphic viewing distance of about 2 m. A suitable transparent layer material with a frictionally modified surface is available from 3M, St. Paul, Minn., USA under the trade designations "SafetyWalk."

In addition, since the image-protective layer must remain substantially clear over the image layer on the base layer, it can be necessary to emboss or adhere abrasive particles only selected areas or to emboss or adhere abrasive particles in a predetermined pattern to maintain the color, clarity or contrast of the image layer. Embossing in selected or patterned areas will establish embossed areas 40 and land areas 42 (FIG. 1) on the exposed surface 36 of the image-protective component 30. Adherence of abrasive materials in patterned or selected areas will establish roughened areas 56 and land areas 58 (FIG. 2) in the exposed surface 53 of the image-protective component 30. While the ratio of embossed areas to unembossed areas on the surface of the base layer will vary widely depending on the size, complexity and color scheme of the image layer, and the resultant refractive index of the image-protective component, in general the ratio of embossed area to unembossed area must be sufficient to maintain the clarity of image-protective layer.

The multilayer graphic articles of the present invention can be readily manufactured in a number of ways. See, for example, U.S. Pat. No. 5,468,532 to Ho et al., which has been incorporated herein by reference. The polymeric films used in the layers of the present invention can be cast, extruded calendared or blown and subsequently treated to improve adhesion to subsequently applied layers, if necessary. The color layers of the image layer can be screen printed or transfer laminated to base layer as can the image-protective layer and the adhesives. The order of these manufacturing steps can be varied. If an image-protective layer is prepared and cast onto a removable liner, the image layer can then be applied to the base film by a thermal transfer lamination or a printing technique. Alternatively, the image layer and the image-protective layer can be coated in tandem via a two stage process, or coated in tandem by simultaneously applying the image-protective layer and the image layer using a laminar flow coater.

The image-protective layer can be embossed on one or both major surfaces during film production, or subsequent to film production, using conventional film processing equipment and techniques well known in the art. If abrasive particle are to be used to provide skid resistant properties on the surface of the image-protective layer, a binder "layer" can first be applied to the image-protective film printed in a patterned way. Then, before the film enters an oven for curing, the selected abrasive particles are sprinkled over the entire surface of the film. The particles sink into the areas that have been (pattern) printed with the binder and protrude slightly. After the film has been cured in the oven, the particles are firmly connected to the film in the patterned areas. In the alternative, the binder can be applied to entire surface of the image-protective film, and the abrasive particles can be applied thereto in a patterned fashion. Each method provide a surface with a patterned arrangement of abrasive particle, but the alternative method results in a slightly thicker image-protective layer construction.

Figure 3:
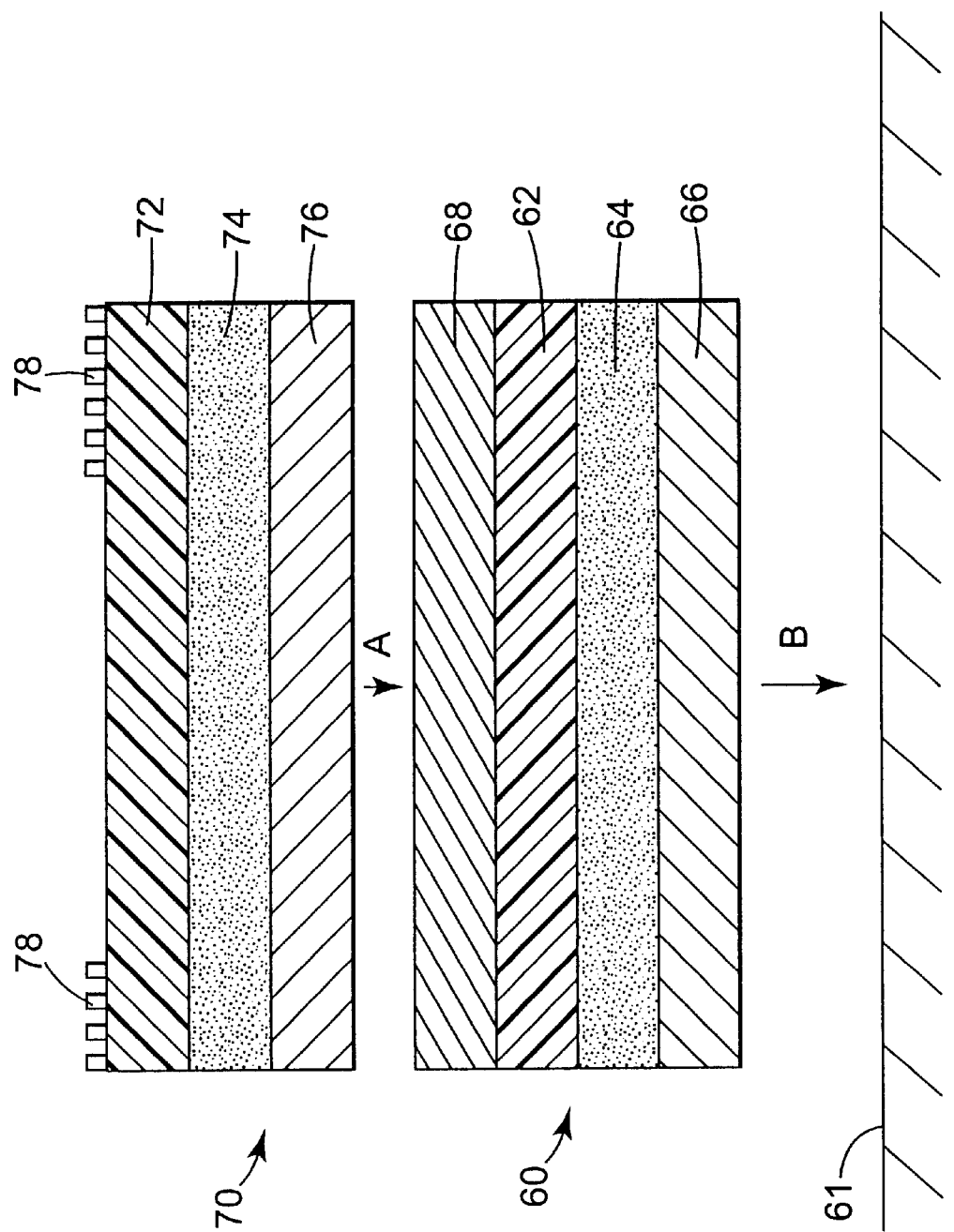
FIG. 3 is a schematic cross sectional view of an embodiment of an outdoor advertising kit of the present invention.

However, as shown in FIG. 3, which is not drawn to scale, the advertising system of the present invention is preferably provided in a kit form with two principal components, a base layer 60 and an image-protective layer 70. It is envisioned that the base layer 60 can be imaged by the customer using a conventional printing technique on equipment commonly available at a local print shop. Following the printing step, the base layer component and the image-protective component can be laminated using conventional laminating equipment to create a graphic article for outdoor advertising or other decorative purposes.

As described in detail above, the base layer includes a polymeric film 62 having applied on its surface an adhesive layer 64 appropriate to adhere the graphic article to an outdoor surface 61. Also shown in FIG. 3 is an optional removable liner 66, which typically protects the base adhesive layer 64 from dirt and other contaminants prior to application of the graphic article to an outdoor surface. Useful liners include silicone coated paper or polymeric films.

The surface of the base film opposite the adhesive layer 64 is suitable for application of layers of colors to form thereon a printed image layer 68. This surface of the base film 62 can be digitally imaged by the purchaser, who can print any custom advertising message thereon by any conventional printing method on commonly available printing equipment. For example, electrostatic transfer for digital imaging employs a computer to generate an electronic digital image, an electrostatic printer to convert the electronic digital image to a multicolor toned image on a transfer medium, and a laminator to transfer the toned image to a durable substrate. Electrostatic printing systems include those available from 3M, St. Paul, Minn., USA under the trade designation "Scotchprint Electronic Graphics System." In this system a personal computer is used to electronically store and manipulate images. Suitable electrostatic printers include single-pass printers and multiple pass printers. Single Pass Printers include the machines available under the trade designations "9510" and "9512" from Nippon Steel Corporation of Tokyo, Japan, and those available under the trade designations "Scotchprint 2000 Electrostatic Printer" from 3M, St. Paul, Minn., USA. Suitable multiple-pass printers include those available under the trade designation "Model 8900 Series" printers from Xerox Corporation of Rochester N.Y., USA and those available under the trade designation "Model 5400 Series" from Raster Graphics of San Jose, Calif., USA.

Examples of suitable electrostatic toners include those available under the trade designations "Model 8700 Series" toners from 3M, St. Paul, Minn., USA, and suitable transfer media include those available under the trade designations "Model 8600" media (e.g., 8601, 8603, and 8605) from 3M.

Laminators for transfer of the digital electrostatic image can include, for example, those available under the trade designation "Orca III" laminator from GBC Protec, DeForest, Wis., USA.

The second component of the kit or system, the image-protective layer 70, includes an image-protective surface film 72. The film 72 includes a surface having applied thereon a layer of a substantially clear adhesive 74, preferably protected by a readily removable release liner 76. The exposed surface of the image-protective layer is provided with patterns of embossed surface features or adhered abrasive particles that do not unnecessarily obscure the underlying image layer printed on the base film. For clarity, the at least one binder layer used to adhere the abrasive particles to the surface film 72 is not shown in FIG. 3.

Referring in FIG. 3, to advertise outdoors using the advertising system of the present invention, the base film is imaged by screen printing, electrostatic printing or the like to form an image layer 68 thereon. Next, the release liner 76 is removed from the image-protective component 70 to expose the pressure sensitive adhesive 74. As shown by the arrow A, the image-protective component 70 can then be laminated to the image layer 68 on the base layer 60 by any conventional method to form a laminated graphic article 80 (not shown). The release liner 66 is then removed from the base layer 60 and the laminated article 80 is adhered as shown by arrow B to the outdoor surface 61 such as a sidewalk or a parking lot to create an outdoor advertisement or display.

The multilayer graphic articles of the present invention can be applied to many structures and types of surfaces. The structures can be flat or have a compound, contoured surfaces in three dimensions. For application to complex surfaces, the graphic article must be sufficiently flexible to conform to the surface without delaminating or lifting off at the edges. To ensure good adhesion to the outdoor surface, it can be necessary to remove surface dirt, chemical residues and liquids from the surface prior to application of the graphic article to the surface. Typically, following removal of the release liner, the graphic article is smoothly and flatly applied in one continuous motion. The graphic article can be squeegeed flat by a roller to remove entrapped air and to provide a good adhesive bond with the underlying surface.

The advertising system of the present invention will now be described with reference to the following non-limiting examples.

EXAMPLES

Example 1

An durable graphic was prepared for generally horizontal application on an outdoor surface. The final product consisted of two films, a base film and an image-protective film, which were laminated (using a squeeze roll laminator) to produce a finished graphic article. The image-protective film functions as a wear layer, and the base film functions as an image carrier.

Base Film Construction

A 4 mil (0.010 cm) white pigmented vinyl film was laminated to a 5 mil (0.013 cm) thick layer of a crosslinked acrylic adhesive. The adhesive formulation was 90 parts Isooctyl Acrylate (IOA) to 10 parts Acrylic Acid (AA), and is available from 3M, St. Paul Minn., USA under the trade designation "Scotch Laminating Adhesive 468MP." Testing results for this adhesive are listed in Table 1 below. The silicone coated release liner that was on the laminating adhesive was removed and a dimensionally stable liner was applied to the adhesive to provide acceptable performance during the imaging step.

Base Film Imaging

The base film can be imaged using most standard techniques available for printing on vinyl. The base film was imaged using an electrostatic printing process available from 3M, St. Paul, Minn., USA under the trade designation "Scotchprint." The resulting image applied to the base film included 4 color layers and appeared photorealistic so as to be suitable for outdoor advertising.

Image-protective Film Construction

A clear vinyl film having a substantially clear acrylic adhesive layer applied to one surface, available from 3M, St. Paul, Minn., USA under the trade desigation "Fine Resilient Safety Walk" was embossed during production (typical production is vinyl extrusion or calendaring of vinyl film) to produce a non skid surface opposite the adhesive layer. The non-skid surface had a BPN of about 42 as measured under the guidelines of ASTM E-303-93, and complied with Australian/New Zealand Standard "Slip Resistance of Pedestrian Surfaces." The embossed film included a silicone coated release liner to protect the acrylic adhesive from dirt and contamination.

The embossed image-protective film was then laminated to the imaged base film using a cold roll pressure laminator to form a finished graphic article.

Application

The graphic article was applied to a concrete sidewalk. The sidewalk was first generally cleaned with a stiff bristle brush to remove any loose dirt particles. The liner was removed from the graphic article and the graphic article was placed (adhesive side down) on the concrete. The bristle brush was then used to apply even pressure on the top of the graphic article to improve adhesion.

Examples 2–10

Floor graphic samples were prepared and tested as in Example 1, and the adhesive used to attach the graphics to the outdoor surface were varied. The results are set forth in Table 1 below.

TABLE 1

| (A) Ex. Adhesive ID | (B) Static Shear (Minutes) | (C) Applied Shrinkage (.001") | (D) Ply adhesion (Pass/Fail) | Appln Temp (E) (°F.) | (F) 180° PB Adhesion (grams/2.54 cm) |
|---|---|---|---|---|---|
| 1 (a) 468MP | 15752+ | 17 & 12 | Fail | 60° F. (16° C.) | 500–700 |
| 2 (b) 9505 | 3641 | 20 & 13 | Fail | 60° F. | 400–500 |
| 3 (c) 9472 | 80 | Fail (G) | Pass | 60° F. | >1,000 |
| 4 (d) 9774 | 159 | Fail (G) | Fail | 60° F. | 600–900 |
| 5 (e) 160 type | | 16 & 20 | Pass | 50° F. (10° C.) | 75–200 |
| 6 (f) 2X | | 19 & 33 | Pass | 50° F. | 150–450 |
| 7 (g) 3X | | 24 & 37 | Pass | 50° F. | 250–850 |
| 8 (h) 4X | | 28 & 37 | Pass | 50° F. | 300–850 |
| 9 (i) 5X | | 30 & 38 | Pass | 50° F. | 400->1,000 |
| 10 (j) 6X | | 32 & 44 | Pass | 50° F. | 300->1,000 |

A) a.) Scotch laminating adhesive 468MP
b.) Stamark laminating adhesive 9505
c.) Scotch laminating adhesive 9472
d.) Scotch laminating adhesive 9774
e.) 96 parts 2-methylbutyl acrylate, 4 parts acrylamide crosslinked
f.) 3 times coat weight of adhesive used in Example 5
g.) 4 times coat weight of adhesive used in Example 5
h.) 5 times coat weight of adhesive used in Example 5
i.) 6 times coat weight of adhesive used in Example 5
B) 0.5 inch x 0.5 inch (1.3 cm x 1.3 cm) sample applied to stainless steel, 1 Kg weight, room temp
C) Adhesive backed vinyl applied to Al panel, Cross hatched, 24 hr @ 150° F. (66° C.)
D) Apply to Al., Bake 5 min. 150° F. (66° C.), Cool 15 min. Remove at 90° angle
E) Application Temp ° F.
F) 180° Pullback adhesion to concrete patio block
G) Severe edge shrinkage

Example 11

A transparent poly (vinyl chloride) (PVC) film with a transparent adhesive layer and removable release liner on one side, available from 3M, St. Paul, Minn., USA, under the trade designation "Scotchprint 8910," was screen printed with polyurethane in a patterned fashion on the side opposite the adhesive layer. While the polyurethane layer was still wet, aluminum oxide particles were sprinkled uniformly on the surface of the PVC film. The particles readily adhered to the polyurethane layer and protruded above the surface thereof. The particles formed a pattern of dots about 1 inch (2.5 cm) apart, measured center to center. The resulting image-protective film was then laminated to an imaged vinyl film to form a graphic article of the present invention. The graphic article was then applied to an outdoor surface.

It will be understood that the exemplary embodiments described herein in no way limit the scope of the invention. Other modifications of the invention will be apparent to those skilled in the art in view of the foregoing description. These descriptions are intended to provide specific examples of embodiments that clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

What is claimed is:

1. A graphic article comprising:
   (a) a base film wit a first major surface and a second major surface,
   a base film adhesive layer applied on the first major surface, wherein the base film adhesive layer comprises an adhesive composition selected such that the article will be removable from an outdoor surface, and
   an image layer applied to the second major surface of the base film; and
   (b) a substantially clear image-protective top film with a first major surface and a second major surface, a layer of a substantially clear adhesive on the first major surface, and wherein the second major surface of the image-protective layer is embossed to provide a BPN of at least 35 as measured by the procedures specified in ASTM E-303-93;
   wherein the image-protective top film is attached to and overlies the base film and he image layer, and the image layer is visible through the image-protective top film.

2. A graphic article as claimed in claim 1, wherein the base film is selected from the group consisting of vinyl films and polyurethane films.

3. A graphic article as claimed in claim 1, wherein the base film adhesive is an acrylic adhesive.

4. A graphic article as claimed in claim 3, wherein the acrylic adhesive is crosslinked.

5. A graphic article as claimed in claim 1, wherein the substantially clear adhesive applied to the first major surface of the image-protective layer is an acrylic pressure sensitive adhesive.

6. A graphic article as claimed in claim 1, wherein the second major surface of the image-protective layer further comprises at least one substantially transparent clear coat primer layer, and the at least one clear coat primer layer has adhered thereto abrasive particles.

7. A graphic article as claimed in claim 1, further comprising a removable base film liner adhered to the base film adhesive layer.

8. A graphic article as claimed in claim 1, wherein only a portion of the second major surface of the image-protective layer is embossed to provide a BPN of at least 35 as measured by the procedures specified in ASTM E-303-93.

9. An outdoor advertising kit, comprising:
   (a) a polymeric base film with a first major surface and a second major surface, a base film adhesive layer applied on the first major surface of the base film, wherein the base film adhesive layer comprises an adhesive composition selected such that the base film is removable from an outdoor surface, and wherein the second major surface of the base film is not imaged, but is capable of being imaged by a printing technique selected from the group consisting of thermal transfer, screen printing, electrostatic printing, offset printing and ink jet printing; and
   (b) a substantially clear image-protective top film with a first major surface and a second major surface, a layer of a substantially clear pressure sensitive adhesive applied to the first major surface, and wherein the second major surface of the image-protective layer is embossed to provide a BPN of greater than about 35 as measured by the procedures specified in ASTM E-303-93; and the image-protective top film is intended for lamination to the base film, and, when so attached, the image-protective top film overlies the base film and an image layer located thereon, and the image layer is visible through the image-protective top film.

10. An outdoor advertising kit as claimed in claim 9, wherein the base film and the image-protective film are vinyl films.

11. An outdoor advertising kit as claimed in claim 9, wherein the base film adhesive and the clear pressure sensitive adhesives are selected from the group consisting of acrylic adhesives.

12. An outdoor advertising kit as claimed in claim 11, wherein the acrylic adhesive is crosslinked.

13. An outdoor advertising kit as claimed in claim 9, wherein the base film is embossed.

14. An outdoor advertising kit as claimed in claim 9, wherein the second major surface of the image-protective layer further comprises at lease one substantially transparent clear coat primer layer, and the at least one clear coat primer layer has adhered thereto abrasive particles.

15. An outdoor advertising kit as claimed in claim 14, wherein the primer layer is a polyurethane layer.

16. An outdoor advertising kit as claimed in claim 9, wherein only a portion of the second major surface of the image-protective layer is embossed to provide a BPN of at least 35 as measured by the procedures specified in ASTM E-303-93.

17. A method for outdoor advertising with a multilayer graphic article comprising:
   providing a polymeric base film with a first major surface and a second major surface,
   a base film adhesive layer applied on the first major surface of the base film, wherein the base film adhesive layer comprises an adhesive composition selected to render the graphic article removable from an outdoor surface, a removable base film liner adhered to the base film adhesive layer, wherein the second major surface of the base film is imageable;
   providing a substantially clear image-protective top film with a first major surface and a second major surface, a layer of a substantially clear pressure sensitive adhesive applied to the first major surface of the image-protective top film, and a removable top film liner adhered to the substantially clear pressure sensitive adhesive on the first major surface of the image-protective top film, wherein the second major surface of the image-protective layer is embossed to provide a BPN of greater than about 35 as measured by the procedures specified in ASTM E-303-93;

imaging the second major surface of the base film to form an image layer thereon by a printing technique selected from the group consisting of thermal transfer, offset printing, screen printing, electrostatic printing, and ink jet print;

removing the top film liner from the substantially clear pressure sensitive adhesive on the first major surface of the image-protective top film;

laminating the image-protective top film on the second major surface of the base film with the pressure sensitive adhesive on the first mayor surface of the image-protective film, so that the image-protective top film overlies the base film and the image layer, and the image layer is visible through the image-protective top film;

removing the base film liner from the base film adhesive layer on the first major surface of the base film; and adhering the first major surface of the base film to an outdoor surface with the base film adhesive.

18. A method for outdoor advertising as claimed in claim 17, wherein only a portion of the second major surface of the image-protective layer is embossed to provide a BPN of at least 35 as measured by the procedures specified in ASTM E-303-93.

19. A method for outdoor advertising as claimed in claim 17, further comprising removing the first major surface of the base film from the outdoor surface with the base film adhesive without leaving substantial adhesive residue on the substrate.

20. A method for outdoor advertising as claimed in claim 17, wherein the second major surface of the base film is not imaged as provided.

* * * * *

UNITED STATES PATENT AND TRADEMARK OFFICE
CERTIFICATE OF CORRECTION

PATENT NO.     : 6,180,228 B1                                      Page 1 of 1
DATED          : January 30, 2001
INVENTOR(S)    : Robert R. Condon et al.

It is certified that error appears in the above-identified patent and that said Letters Patent is hereby corrected as shown below:

<u>Title page,</u>
Item [75], Inventors, please add -- Robert R. Condon of Woodbury, Minnesota, USA -- as the first named inventor.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,180,228 B1  Page 1 of 1
DATED          : January 30, 2001
INVENTOR(S)    : Condon, Robert R.

It is certified that error appears in the above-identified patent and that said Letters Patent is hereby corrected as shown below:

Column 13,
Line 11, delete "wit" and insert in place thereof -- with --.
Line 45, delete "he" and insert in place thereof -- the --.

Column 14,
Line 39, delete "lease" and insert in place thereof -- least --.

Column 15,
Line 8, delete "print;" and insert in place thereof -- printing;--.
Line 14, delete "mayor" and insert in place thereof -- major--.

Signed and Sealed this

Thirteenth Day of May, 2003

JAMES E. ROGAN
*Director of the United States Patent and Trademark Office*